United States Patent [19]

Sengoku

[11] Patent Number: 4,954,909
[45] Date of Patent: Sep. 4, 1990

[54] DATA MEMORIZING DEVICE WHICH DETERMINES THE MOVEMENT OF THE RECORDING HEAD

[75] Inventor: Masaharu Sengoku, Amagasaki, Japan

[73] Assignee: Mitsubishi Denki Kabushiki Kaisha, Tokyo, Japan

[21] Appl. No.: 462,350

[22] Filed: Jan. 3, 1990

Related U.S. Application Data

[63] Continuation of Ser. No. 152,497, Feb. 5, 1988, abandoned.

[30] Foreign Application Priority Data

May 13, 1987 [JP] Japan ................... 62-117411

[51] Int. Cl.$^5$ .......................... G11B 5/55; G11B 21/08
[52] U.S. Cl. .............................. 360/78.04; 360/78.06; 360/78.11
[58] Field of Search ................... 360/78.04–78.14, 360/75; 369/32, 33, 41

[56] References Cited

U.S. PATENT DOCUMENTS

| | | | |
|---|---|---|---|
| 3,458,786 | 7/1969 | Thompson | 360/78.05 |
| 3,530,447 | 9/1970 | Lambert | 360/78.11 |
| 3,686,650 | 8/1972 | Gleim et al. | 360/78.04 |
| 4,547,822 | 10/1985 | Brown | 360/78.07 |

FOREIGN PATENT DOCUMENTS 60-101777  6/1985  Japan .

*Primary Examiner*—Alan Faber
*Assistant Examiner*—Steven R. Garland
*Attorney, Agent, or Firm*—Oblon, Spivak, McClelland, Maier & Neustadt

[57] ABSTRACT

A magnetic head is moved in the radial direction of a magnetic recording medium carrier by means of an actuator to record or reproduce data stored therein. The actuator is actuated by an instruction signal from a servo circuit through a computer. The servo circuit receives a position signal and a speed signal according to the movement and stopping of the actuator and generates digital signals having high and low level logical values as a result of a comparison of the position and speed signals with position-determining and speed-determining instruction signals from the computer. A calculator receives the digital signals and a clock signal from a clock signal generator and outputs a pulse signal to the computer when the digital signal takes the high level logical value and resets the counting operation when the digital signal takes the low level logical value.

2 Claims, 4 Drawing Sheets

DATA MEMORIZING DEVICE WHICH DETERMINES THE MOVEMENT OF THE RECORDING HEAD

This application is a continuation of application Ser. No. 07/152,497 filed on Feb. 5, 1988, now abandoned.

BACKGROUND OF THE INVENTION

1. Field of the Invention

The present invention relates to a data memorizing device capable of recording or reproducing data by a relative movement between a disk-like recording medium carrier which records data by causing a change in a physical condition on the surface of the recording medium carrier and a magnetic head placed near the surface of the recording medium carrier.

2. Discussion of Background

FIG. 4 is a cross-sectional view showing a conventional data memorizing device similar to that as disclosed in, for instance, Japanese Unexamined Patent Publication No. 101777/1985, and FIG. 5 is a block diagram showing a position-determining control system for the data memorizing device.

In FIG. 4, a reference numeral 1 designates a base, a numeral 2 designates a spindle motor fixed to the base, a numeral 3 designates a disk-like recording medium carrier, namely, a magnetic disk attached to the rotary shaft of the spindle motor, a numeral 4 designates a magnetic head which is held by a compression spring 5 at a position near a surface of the magnetic disk 3 The magnetic head 4 is adapted to convert an electric signal into a change of magnetic condition on the surface of the magnetic disk 3 or to convert a change of the magnetic condition into an electric signal. A numeral 5 designates a spring for urging the magnetic head 4 to the magnetic disk 3 by its spring action, a numeral 6 designates an arm for fixedly supporting the compression spring, a numeral 10 designates an actuator adapted to move the magnetic head 4 in the radial direction of the magnetic disk by the aid of the arm 6 and the spring 5 and a numeral 11 designates a carriage for supporting the arm 6, the carriage being movable on the base 1 by means of bearings.

A driving coil 12 is mounted on the carriage 11. A position sensor 13 comprises an optical scale fixed to the carriage and a transducer fixed to the base 1. A numeral 15 designates a yoke for forming a magnetic path and a numeral 16 designates a magnet attached to the yoke.

In FIG. 5, a reference numeral 20 designates a computer for processing data for controlling the position and the speed of the magnetic head 4, a numeral 21 designates a servo circuit which receives a position-determining instruction signal from the computer 20 and drives the carriage 11 by actuating the driving coil 12 in the actuator 10. Also, the servo circuit 21 is so adapted that it receives a position signal indicating the position of the magnetic head 4 detected by the position sensor 13 on the magnetic disk 3 and a speed signal obtained by differentiating and shaping the position signal, and that it compares, on one hand, the position-determining instruction signal from the computer 20 with the position signal, and on the other hand, a speed-determination signal from the computer 20 with the speed signal from a speed demodulation circuit 22, which differentiates and shapes the position signal detected by position sensor 13 and outputs the speed signal. A numeral 23 designates a read/write circuit which receives a data recording/reproducing instruction signal from the computer 20 to record the data in the magnetic disk 3 or to reproduce the data stored in the magnetic disk 3 through the magnetic head 4.

The operation of the conventional data memorizing device having the construction as above-mentioned will be described.

When the magnetic disk 3 is rotated at a predetermined revolution by driving the spindle motor 2, there produces a viscous air stream on and near the surface of the magnetic disk 3 and a floating force is applied to the magnetic head 4 which is held in the viscinity of the recording surface, whereby there is obtainable a fluid dynamic spacing function by which a predetermined air gap is kept between the magnetic head 4 and the magnetic disk 3 in the balance of a pressing force by the compression spring 5 and the viscous air stream. Under such condition, when a position-determining instruction signal is supplied to the servo circuit 21 from the computer 20, an electric current having the intensity corresponding to the position-determining instruction signal is supplied to the driving coil 12 in the actuator 10, whereby a magnetic circuit is formed in the yoke 15, the magnet 16 and the air gap. In accordance with the Flemming's left hand rule, the carriage 11 is driven by the influence of the magnetic field by the magnetic circuit, and the magnetic head 4 is moved in the radial direction of the magnetic disk 3. The traverse movement of the magnetic head 4 is detected by the position sensor 13, which generates a position signal corresponding to the position of the head 4. Further, the position signal is subjected to differentiating and shaping by the speed demodulation circuit 22 to detect a speed signal. The position signal and the speed signal are detected by the servo circuit 21 in which the signals are respectively compared with the position-determining instruction signal and the speed-determination instruction signal from the computer 20 so that the magnetic head 4 is brought to a predetermined position on the magnetic disk 3. On completion of the position-determining operation, the read/write circuit 23 renders the magnetic head 4 to record data in the magnetic disk 3 or to reproduce data stored in the magnetic disk 3 by receiving a recording or reproduction instruction signal from the computer 20.

However, the conventional data memorizing device has a disadvantage as follows. When a foreign substance enters the gap formed between the magnetic head 4 and the surface of the magnetic disk by the fluid dynamic spacing function, or a strong vibration or a shock is applied to the base 1, the magnetic head 4 may come into contact with the surface of the magnetic disk 3 to thereby damage either the surface of the magnetic disk 3 or the head 4. The damaged magnetic disk surface or the magnetic head 4 causes a change in a floating force applied to the head 4. If such an undesirable state is left for a long time, the magnetic head 4 drops on the magnetic disk 3 to thereby lose data stored in the magnetic disk 3.

SUMMARY OF THE INVENTION

It is an object of the present invention to provide a data memorizing device capable of preventing data stored in the magnetic disk from being lost even though a magnetic head drops on the surface of a magnetic disk.

The foregoing and the other objects of the present invention have been attained by providing a data memorizing device comprising a rotatable disk-like recording medium carrier, a magnetic head placed near a recording surface of the recording medium carrier and an actuator which supports the magnetic head and is driven by an instruction signal given by an outer device to move the magnetic head so as to traverse the recording surface so that the magnetic head is brought to a predetermined position on the recording surface, characterized in that the data memorizing device comprises a digital signal generating mean for generating digital signals of a high level logical value and a low level logical value which respectively correspond to the movement and the stop of the actuator; a signal detecting means for detecting the digital signals; a clock signal generating means for generating a clock signal having a predetermined frequency; and a calculating means which receives the clock signal and the digital signals and which outputs a pulse signal having a predetermined value by counting the pulses of the clock signal when the digital signal takes the high level logical value, and resets the counting operation when the digital signal takes the low level logical value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
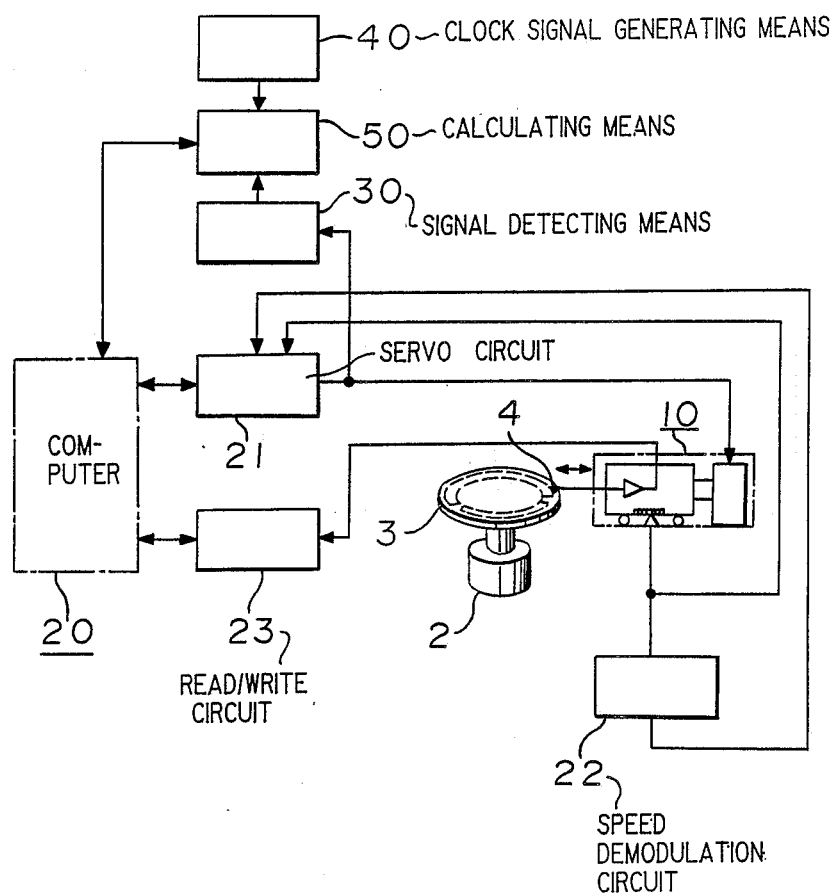
FIG. 1 is a block diagram showing an embodiment of the data memorizing device according to the present invention.

Referring to the drawings, wherein the same reference numerals designate the same or corresponding parts, and more particularly to FIG. 1 thereof, there is shown a block diagram of an embodiment of the data memorizing device according to the present invention.

In FIG. 1, a reference numeral 30 designates a signal detecting means for detecting the digital signal as a high level logical value or a low level logical value which respectively correspond to the movement or the stop of an actuator 10, a numeral 40 designates a clock signal generating means for generating a clock signal having a predetermined frequency, and a numeral 50 designates a calculating means which receives the digital signal detected by the signal detecting means 30 and the clock signal generated from the clock signal generating means 40 and which outputs a pulse signal having a predetermined value by counting the pulses of the clock signal when the digital signal takes the high level logical value, and resets the counting operation when the digital signal takes the low level logical value.

The operation of the data memorizing device having the above-mentioned construction will be described.

When the magnetic disk 3 is rotated at a predetermined revolution speed, a viscous air stream is produced on or near the surface of the magnetic disk 3, whereby the magnetic head 4 placed in the vicinity of the surface of the magnetic disk 3 floats due to the viscous air stream; thus, a small air gap is maintained between the magnetic head 4 and the surface of the magnetic disk 3 by a fluid dynamic spacing function.

Figure 2:
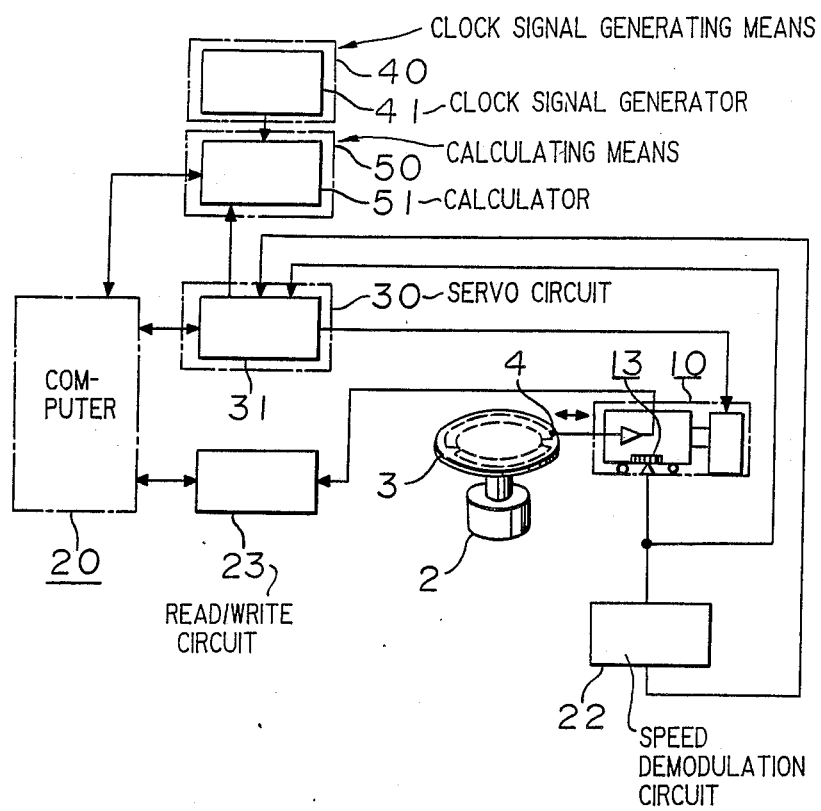
FIG. 2 is a block diagram showing another embodiment of the present invention.

Under such condition, when a position-determining instruction signal is supplied to the servo circuit 21 from the computer 20, an electric signal which corresponds to the position-determining instruction signal is fed to the actuator 10, whereby the magnetic head 4 is moved in the radial direction of the magnetic disk 3 by means of the actuator 10. The traverse movement of the magnetic head 4 is detected by the position sensor 13, which outputs a position signal. The position signal supplied to the speed demodulation circuit 22 is subjected to differentiating and shaping operations, whereby a speed signal is produced. The position signal and the speed signal are supplied to the servo circuit 21. The servo circuit 21 compares the position signal with the position-determining signal from the computer 20, and also, it compares the speed signal with a speed-determination signal from the computer 20, so that the magnetic head 4 is set at a predetermined location of the magnetic disk 3. On the basis of the output from the servo circuit 21, the digital signal detecting means detects the high level logical value or the low level logical value which respectively correspond to the movement or the stop of the actuator 10 and feeds it to the calculating means 50 which in turn receives the clock signal generated from the clock signal generating means 40. The calculating means 50 counts the pulses of the clock signal when the digital signal takes the high level logical value and outputs a pulse signal when a predetermined number of pulses are counted. The computer 20 outputs a reproduction instruction signal to the read/write circuit 23 upon receiving the pulse signal, whereby the data stored in the magnetic disk 3 is reproduced by the magnetic head 4 so that the reproduced data is shifted into a memorizing device in the computer 20. FIG. 2 is a block diagram showing in more specific manner the embodiment as shown in FIG. 1. In FIG. 2, the same reference numerals as in FIG. 1 designate the same parts. A servo circuit 31 receives a position-determining instruction signal from the computer 20 to drive the actuator 10. The servo circuit 31 is also adapted to compare the position-determining instruction signal with the position signal indicating the position of the magnetic head 4 on the magnetic disk 3, the position being detected by the position sensor 13, and to compare the speed signal obtained by differentiating and shaping the position signal with a speed-determination signal from the computer 20. The servo circuit 31 is further adapted to output a digital signal of a high level logical value or a low level logical value which respectively correspond to the movement or the stop of the actuator 10 on the basis of the comparison of the above-mentioned signals. A clock signal generator 41 constituting the clock signal generating means 40 outputs a clock signal having a predetermined frequency. A calculator 51 receives the digital signal output from the servo circuit 31 and the clock signal output from the clock signal generator 41 so that it counts the number of pulses of the clock signal when the digital signal takes the high level logical value, whereby a pulse signal is output when a predetermined number of pulses are counted by the calculator, and the counting operation is reset when the digital signal takes the low level logical value.

In FIG. 2, the signal detecting means 30 includes the servo circuit 31, and the calculating means 50 includes the calculator 51.

Figure 6:
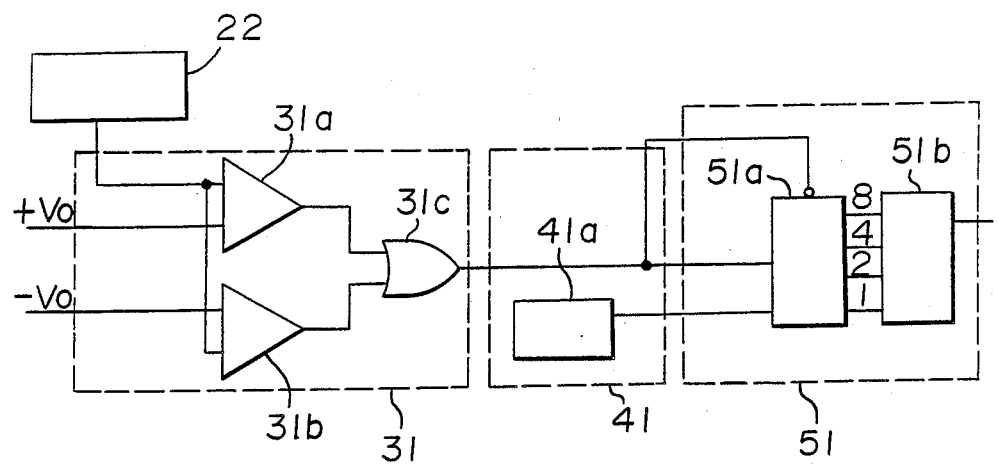
FIG. 6 is a block diagram of part of the system shown in FIG. 2.

FIG. 6 is a block diagram showing an embodiment of the construction of the important part in FIG. 2 in more detail. In FIG. 6, the servo circuit comprises a first comparator 31a having a first input terminal connected to the speed demodulation circuit 22 and a second input terminal connected to a positive reference voltage source (+Vo), a second comparator 31b having a first input terminal connected to the speed demodulation circuit 22 and a second terminal connected to a negative reference voltage source (−Vo), and an OR circuit 31c connected to the output terminal of the comparators 31a, 31b; the clock signal generator 41 comprises an ordinary oscillator 41a such as a PLL (phase lock loop), a crystal oscillator (Xtal) and so on; and the calculator 51 comprises a counter connected to the OR circuit 31c and the oscillator 41a and having a reset terminal and a decoder 51b connected to the counter 51a.

A voltage signal representing the moving speed of the magnetic head 4 as the output of the speed demodulation circuit 22 is input into the comparators 31a, 31b to be respectively compared with the positive and negative reference voltages (±Vo). The OR circuit 31c outputs a signal when the magnetic head 4 is moved.

In the calculator 51, when the magnetic head 4 is stopped, i.e. the OR circuit 31c being in a low level, the counter 51a is reset. When the head 4 is moved, i.e. the OR circuit being in a high level, the resetting condition is removed and the counter 51a counts the clock of the oscillator 41a. The decoder 51b decodes the output of the counter 51a and outputs a signal when it counts a predetermined value, i.e. the moving time of the magnetic head 4 is prolonged. When the time is short, the head is stopped before the predetermined value is counted. In this case, the OR circuit 31c becomes the low level so that there is no signal.

The function of the embodiment shown in FIGS. 2 and 6 is described with reference to FIG. 3.

Figure 3A:
FIG. 3A is a diagram showing the waveform of a digital signal generated from the data memorizing device shown in FIG. 1.
Figure 3B:
FIG. 3B is a diagram showing the waveform of a clock signal.
Figure 3C:
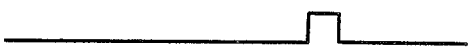
FIG. 3C is a diagram showing the waveform of a pulse signal generated from a calculator used for the data memorizing device of the present invention.
Figure 4:
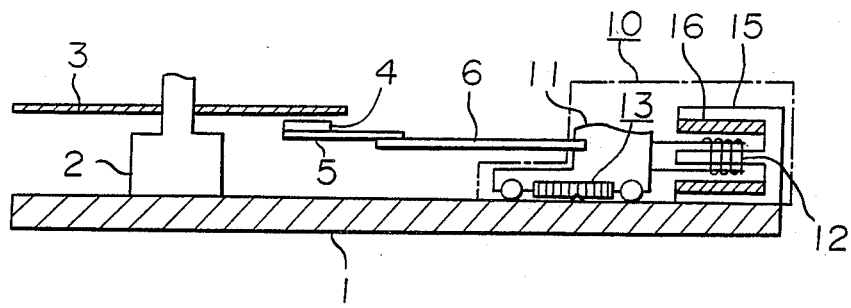
FIG. 4 is a diagram showing a conventional data memorizing device.
Figure 5:
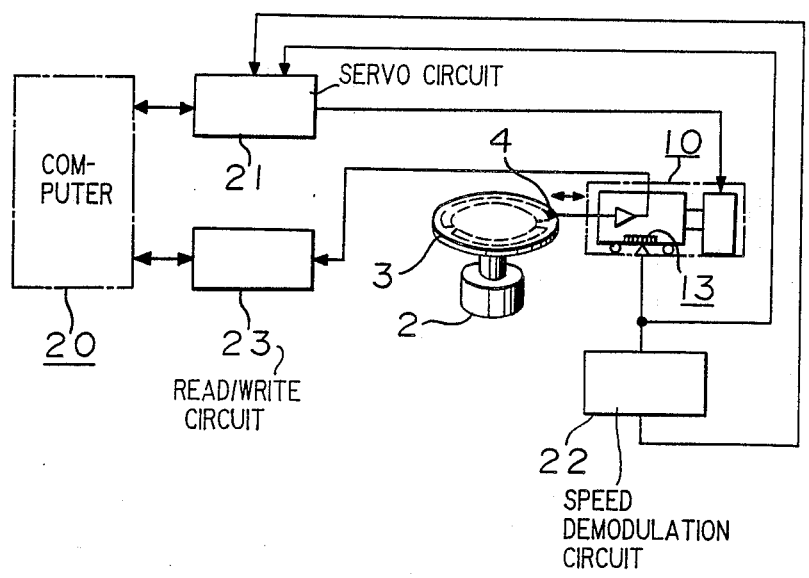
FIG. 5 is a block diagram of the position-determining control system used for the conventional device.

FIG. 3A shows the waveform of the digital signals having the high level logical value and the low level logical value which are output from the servo circuit 31; FIG. 3B shows the waveform of the clock signal generated from the clock signal generator 41, and FIG. 3C shows the waveform of the pulse signal which is output when the calculator counts a predetermined number of pulses of the clock signal at the time of the digital signal taking a high level logical value. In FIG. 3A, the high level logical value corresponds to the movement of the actuator 10 and the low level logical value corresponds to the stop of the actuator 10 which is driven by receiving the position-determining instruction signal from the servo circuit 31 as described before. The digital signal (as shown by the solid line in FIG. (3A) is supplied from the servo circuit 31 to the calculator 51 in which the number of the pulses of the clock signal (as shown in FIG. 3B) are counted when the digital signal takes a high level logical value. The counting operation by the calculator 51 is stopped when the digital signal takes a low level logical value. In a case as shown in FIG. 3, the counting operation is reset when five pulses are counted. The computer 20 determines a position-determining time corresponding to the position-determining instruction signal, and the calculator 51 holds the position-determining time as a predetermined value. Assuming that a set value, i.e. a position-determining time, corresponds to a high level logical value of the digital signal, which includes seven pulses, namely, it is in the range from initiation of counting the pulses of the clock signal to the seventh pulse (⑦ FIG. 3B). Accordingly, counting of the fifth pulse does not cause generation of the pulse signal from the calculator 51 to the computer 20 because it does not reach the seventh pulse as the set value which corresponds to the position-determining time.

If there results a fault on the surface of the magnetic disk 3 or the magnetic head 4, the floating force applied to the magnetic head 4 is changed; this causes mutual contact of the magnetic head 4 and the surface of the magnetic disk 3 whereby the position-determining time becomes higher. This means that the high level logical value of the digital signal is prolonged for the portion as indicated by a broken line in FIG. 3A. Accordingly, the calculator 51 counts seven pulses of the clock signal and outputs the pulse signal (as shown in FIG. 3C) to the computer 20 and resets the counting as soon as counting the eighth pulse. The computer 20 generates a reproduction instruction signal to the read/write circuit 23 on the basis of the pulse signal so that the data stored in the magnetic disk 3 is reproduced by means of the magnetic head 4 to shift the data in a memorizing device in the computer 20 before the magnetic head 4 drops on the surface of the magnetic disk 3 and the data are lost.

In the above-mentioned embodiment, a description is made as to the case that the calculator 51 counts the pulses of the clock signal on the basis of the digital signal output from the servo circuit 31 and the clock signal output from the clock signal generator 41 to determine the position-determining time. However, the same effect can be obtained by using another means such as a micro-prosesser.

Further, in the above-mentioned embodiment, the position of the magnetic head 4 with respect to the magnetic disk 3 is detected by the position sensor 13. However, it is possible that the position signal for a servo track recorded in the magnetic disk 3 is detected by reproducing it by means of the magnetic head 4 or another suitable magnetic head.

In addition, a description has been made as to the data memorizing device utilizing a magnetic means. However, another means other than the magnetic means can be used as far as it is used for the data memorizing device having a disk-like data recording carrier.

As described above, the present invention concerns a data memorizing device wherein a magnetic head is placed near the recording medium of a disk-like data recording carrier which is rotated, and an actuator for supporting the magnetic head is moved on the basis of an instruction signal provided from the outside so that the magnetic head is traversely moved on the recording surface of the data recording carrier to a predetermined position. In the data memorizing device, there is provided a calculating means which receives digital signals consisting of two logical values of a high level logical value and a low level logical value which respectively correspond to the movement and the stop of the actuator, and a clock signal having a predetermined frequency. The calculating means calculates the pulses of the clock signal when the digital signal takes the high level logical value, and generates a pulse signal when a predetermined number of pulses is counted. On the other hand, the calculating means resets the counting operation when the digital signal takes the low level logical value. Accordingly, when the position-determining time is prolonged and counting of the pulses reaches a predetermined value, a pulse signal is generated, whereby the computer generates an instruction signal so that the data in the data recording carrier is reproduced to record in another data memorizing device.

Obviously, numerous modifications and variations of the present invention are possible in light of the above teachings. It is therefore to be understood that within the scope of the appended claims, the invention may be practiced otherwise than as specifically described herein.

What is claimed is:

1. A data memorizing device comprising a rotatable disk-like recording medium carrier, a magnetic head placed near a recording surface of said recording medium carrier and an actuator which supports said magnetic head and is driven by an instruction signal given by an outer device to move said magnetic head so as to traverse said recording surface so that said magnetic head is brought to a predetermined position on said recording surface, characterized in that said data memorizing device comprises a digital signal generating means for generating a digital signal consisting of two logical values of a high level value and a low level value which respectively correspond to a set amount of movement and the stop of said actuator; a signal detecting means for detecting said digital signal; a clock signal generating means for generating a clock signal having pulses of a predetermined frequency; and a calculating means which receives said clock signal and digital signal and which outputs a pulse signal having a predetermined value by counting the pulses of said clock when said digital signal takes the high level logical value and when said counted pulses equal a predetermined number, and resets the counting operation when said digital signal takes the low level logical value.

2. The data memorizing device according to claim 1, wherein time for positioning said magnetic head is related to the number of pulses of the clock signal generated from said clock signal generating means.

* * * * *